United States Patent
Kocherovsky

(10) Patent No.: US 9,862,040 B2
(45) Date of Patent: Jan. 9, 2018

(54) MECHANISM FOR ENHANCED, BI-DIRECTIONAL FINE ADJUSTMENT OF CUTTING INSERT CARTRIDGES IN MACHINE TOOLS

(71) Applicant: SANDVIK INTELLECTUAL PROPERTY AB, Sandviken (SE)

(72) Inventor: Yevgeny Kocherovsky, West Bloomfield, MI (US)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 445 days.

(21) Appl. No.: 14/501,351

(22) Filed: Sep. 30, 2014

(65) Prior Publication Data

US 2016/0089730 A1 Mar. 31, 2016

(51) Int. Cl.
*B23C 5/24* (2006.01)
*B23B 27/16* (2006.01)
*B23B 29/034* (2006.01)

(52) U.S. Cl.
CPC ........ *B23C 5/2472* (2013.01); *B23B 29/0341* (2013.01); *B23C 5/241* (2013.01); *B23B 2260/056* (2013.01); *B23C 5/2444* (2013.01); *B23C 5/2479* (2013.01); *B23C 2260/28* (2013.01)

(58) Field of Classification Search
CPC .......... B23B 2260/056; B23B 29/0341; B23C 2260/28; B23C 5/241; B23C 5/2472; B23C 5/2479; B23C 5/2444
See application file for complete search history.

(56) References Cited

U.S. PATENT DOCUMENTS 1,125,102 A * 1/1915 Huther ...................... B23C 5/22
125/15
1,659,370 A * 2/1928 Magin ............... B23B 29/03407
408/183

(Continued)

FOREIGN PATENT DOCUMENTS

CH 176095 A 3/1935
EP 0968783 A1 1/2000

(Continued)

*Primary Examiner* — Sara Addisu
(74) *Attorney, Agent, or Firm* — Corinne R. Gorski

(57) ABSTRACT

Cutting insert cartridge for chip removing machining tools has an axial adjustment system threadedly engaged with a cartridge body and a tool body. The axial adjustment system includes a differential screw in threaded engagement with the tool body either directly, for example by threaded engagement with a threaded opening in the tool body, or indirectly, for example by threaded engagement with a cross dowel fastener slidably positioned in an opening in the tool body. Actuation portion positioned axially between threaded end portions of the differential screw has an engagement feature on an outer surface to be driven, e.g., with a tool or by hand, to rotate the differential screw and adjust the axial position of the cartridge. The spaced apart relationship improves access to the actuation portion and engagement feature for rotation of the differential screw. Chip removing machining tools with such cartridges and methods of machining are also disclosed.

4 Claims, 9 Drawing Sheets

(56) References Cited

U.S. PATENT DOCUMENTS

| | | | | |
|---|---|---|---|---|
| 1,681,675 A | * | 8/1928 | Miller | B23C 5/2455 407/36 |
| 2,125,005 A | * | 7/1938 | Jearum | B23B 29/0341 125/39 |
| 3,220,288 A | * | 11/1965 | Yogus | B23B 29/0341 407/87 |
| 3,518,738 A | * | 7/1970 | Porter | B23B 29/03407 407/74 |
| 3,577,810 A | * | 5/1971 | Eckle | B23B 29/0341 408/162 |
| 3,847,555 A | * | 11/1974 | Pegler | B23C 5/2444 407/36 |
| 3,856,427 A | * | 12/1974 | Lovendahl | B23B 29/0341 408/182 |
| 3,937,587 A | * | 2/1976 | Lindem | B23B 29/02 408/153 |
| 4,054,977 A | * | 10/1977 | Plummer | B23B 27/1644 407/108 |
| 4,318,647 A | * | 3/1982 | Erkfritz | B23C 5/2444 407/45 |
| 4,428,704 A | * | 1/1984 | Kalokhe | B23B 29/03421 407/37 |
| 4,592,399 A | * | 6/1986 | Rhodes | B23C 5/207 144/114.1 |
| 4,623,284 A | * | 11/1986 | Greiff | B23C 5/241 407/38 |
| 4,761,103 A | * | 8/1988 | Krstovic | B23B 29/03407 407/45 |
| 4,772,159 A | * | 9/1988 | Bloink | B23C 5/2444 407/37 |
| 4,878,787 A | * | 11/1989 | Hunt | B23B 29/03407 408/153 |
| 4,971,491 A | * | 11/1990 | Cook | B23B 31/006 408/1 BD |
| 5,102,268 A | * | 4/1992 | Mitchell | B23C 5/241 407/36 |
| 5,120,166 A | * | 6/1992 | Woerner | B23D 37/005 407/12 |
| 5,454,667 A | * | 10/1995 | Cirino | B23B 29/0341 408/153 |
| 5,704,742 A | * | 1/1998 | Reinauer | B23B 29/03421 408/156 |
| 5,735,649 A | * | 4/1998 | Boscarino | B23B 29/03428 407/39 |
| 5,863,156 A | * | 1/1999 | Satran | B23C 5/2221 407/36 |
| 6,030,153 A | * | 2/2000 | Votsch | B23C 5/2444 407/36 |
| 6,254,319 B1 | * | 7/2001 | Maier | B23C 5/2444 407/45 |
| 7,300,231 B1 | * | 11/2007 | Liu | B23C 5/04 407/44 |
| 7,753,626 B2 | | 7/2010 | Musil et al. | |
| 7,765,905 B2 | * | 8/2010 | Trumper | B23Q 1/34 318/135 |
| 8,308,403 B2 | * | 11/2012 | Hecht | B23B 29/04 279/77 |
| 8,327,742 B1 | * | 12/2012 | Austin | B23C 5/2472 407/37 |
| 9,168,595 B2 | * | 10/2015 | Heinloth | B23C 5/006 |
| 2002/0154957 A1 | * | 10/2002 | Mizutani | B23C 5/207 407/46 |
| 2005/0169715 A1 | | 8/2005 | Kocherovsky | |
| 2007/0256287 A1 | | 11/2007 | Kocherovsky et al. | |
| 2008/0107493 A1 | | 5/2008 | Nedzlek | |
| 2008/0175682 A1 | * | 7/2008 | Musil | B23B 29/0341 408/153 |
| 2008/0298914 A1 | | 12/2008 | Nedzlek | |
| 2009/0060662 A1 | * | 3/2009 | Maurer | B23C 5/06 407/42 |
| 2010/0178118 A1 | | 7/2010 | Hecht | |
| 2010/0183382 A1 | | 7/2010 | Nedzlek et al. | |
| 2010/0202838 A1 | | 8/2010 | Weaver et al. | |
| 2011/0058910 A1 | | 3/2011 | Nedzlek | |
| 2011/0188951 A1 | * | 8/2011 | Mergenthaler | B23C 5/2226 407/44 |
| 2012/0076599 A1 | * | 3/2012 | Heinloth | B23C 3/06 409/131 |
| 2012/0201622 A1 | | 8/2012 | Kocherovsky et al. | |
| 2012/0230784 A1 | | 9/2012 | Hoefler et al. | |
| 2013/0071193 A1 | * | 3/2013 | Kocherovsky | B23B 29/0341 407/77 |
| 2013/0294853 A1 | * | 11/2013 | Nedzlek | B23C 5/08 407/75 |
| 2014/0234039 A1 | * | 8/2014 | Mada | C07C 213/08 407/77 |
| 2016/0136740 A1 | * | 5/2016 | Mada | B23C 5/241 407/76 |

FOREIGN PATENT DOCUMENTS

| | | | |
|---|---|---|---|
| JP | 02160405 A | * 6/1990 | ....... B23B 29/03407 |
| WO | 2014072988 A1 | 5/2014 | |
| WO | 2014175114 A1 | 10/2014 | |

* cited by examiner

MECHANISM FOR ENHANCED, BI-DIRECTIONAL FINE ADJUSTMENT OF CUTTING INSERT CARTRIDGES IN MACHINE TOOLS

FIELD OF THE DISCLOSURE

The present disclosure relates to chip removing machining tools for cutting workpieces. More specifically, the present disclosure relates to a mechanism that bi-directionally adjusts the position of a cutting insert cartridge relative to the body of the chip removing machining tool using a differential adjustment screw having opposing, threaded ends that interact with a threaded structure at a first end and with a threaded portion of the cartridge at a second end and, interposed between the threaded ends, an actuation portion with an engagement feature on an outer surface. The disclosure relates to the cartridge and adjustment mechanism, as well as to the combination of the chip removing machining tools and cartridge, and to the differential adjustment screw, per se.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

In the cutting industry, specifically the chip removing cutting industry, fine adjustment of the cutting unit is used to precisely locate the cutting edges of cutting inserts in relation to the workpiece. In current chip removing machining tools with separately clamped cartridges, adjustment in the position of the cartridge axial direction, is generally made by an operator unclamping and moving the cartridge in a first direction followed by clamping the cartridge and adjusting the cutting edge location in one direction until positioning is achieved. The cartridge's movement in the first direction is necessary to achieve target position of the cutting edge to perform accurate machining. Over travel of this position is common failure mode of this operation due to inertia of human reaction and judgment when to stop adjusting. When this happens operator must to unclamp cartridge and move screw back, as return action is not available. Then adjustment has to be conducted again. Such repeated positioning creates loss of time as well as loss of productivity and efficiency of operation.

Examples of adjustment mechanisms in chip removing machining tools with cartridge insert holders are disclosed, for example, in U.S. Pat. No. 7,753,626, EP Patent No. 0 968 783 and U.S. Patent Application Publication No. US20130071193, the entire contents of which are incorporated herein by reference.

SUMMARY

The cutting insert cartridge for a chip removing machining tool, cutting insert adjustment differential screw and methods and structures disclosed herein provide improved interconnection, retention and operation of the adjustment differential screw in relation to the body of the chip removing machining tool to allow bi-directional precision adjustment possible without releasing the clamping screw.

An exemplary embodiment of a cutting insert cartridge for a chip removing machining tool comprises a cartridge body including a first end surface, a second end surface, a top surface, and a bottom surface and having a longitudinal axis oriented from the first end surface to the second end surface, a seat for a cutting tool insert, a surface of the seat intersecting the top surface of the cartridge body proximate a first axial end of the cartridge body, a threaded opening in the second end surface of the cartridge body, an opening in the cartridge body extending from a top surface to a bottom surface, the opening located between the seat and a second axial end of the cartridge body, and an axial adjustment system including a differential screw having a first threaded portion, a second threaded portion, an actuation portion, and an engagement feature on an outer surface of the actuation portion, wherein the first threaded portion, actuation portion and second threaded portion are positioned on an axis of the differential screw and the actuation portion is axially between the first threaded portion and the second threaded portion, wherein the engagement feature has an engagement axis that is non-parallel to the axis of the differential screw, and wherein the first threaded portion of the differential screw is threadedly engaged in the threaded opening in the second end surface of the cartridge body.

An exemplary embodiment of a chip removing machining tool comprises a tool body having a longitudinal axis, a cutting insert cartridge mounted in a slot in a surface of the tool body, and an adjustment system for translating the cutting insert cartridge in the slot axially with respect to the longitudinal axis of the tool body, wherein the cutting insert cartridge includes a cartridge body including a first end surface, a second end surface, a top surface, and a bottom surface and having a longitudinal axis oriented from the first end surface to the second end surface, a seat for a cutting tool insert, a surface of the seat intersecting the top surface of the cartridge body proximate a first axial end of the cartridge body, a first threaded opening in the second end surface of the cartridge body, an opening in the cartridge body extending from a top surface to a bottom surface, the opening located between the seat and a second axial end of the cartridge body, and wherein the adjustment system includes a differential screw having a first threaded portion, a second threaded portion, an actuation portion, and an engagement feature on an outer surface of the actuation portion, wherein the first threaded portion, actuation portion and second threaded portion are positioned on an axis of the differential screw and the actuation portion is axially between the first threaded portion and the second threaded portion, wherein the engagement feature has an engagement axis that is non-parallel to the axis of the differential screw, and wherein the first threaded portion of the differential screw is threadedly engaged in the first threaded opening in the second end surface of the cartridge body.

An exemplary embodiment of a cutting insert adjustment differential screw comprises a first threaded portion, a second threaded portion, an actuation portion, an engagement feature on an outer surfaces of the actuation portion, wherein the first threaded portion, actuation portion and second threaded portion are positioned on an axis of the differential screw and the actuation portion is axially between the first threaded portion and the second threaded portion, and wherein the engagement feature has an engagement axis that is non-parallel to the axis of the differential screw.

An exemplary method of adjusting a position of a cutting insert cartridge mounted in embodiments of a chip removing machining tool comprises driving the engagement feature of an actuation portion of a differential screw with a tool, rotating the actuation portion about an axis of the differential screw to produce an axial force bearing on the cutting insert cartridge, and overcoming friction forces to axially adjust the position of the cutting insert cartridge relative to the tool body, wherein the friction forces are generated by a fastener positioned in the opening in the cartridge body extending from the top surface to the bottom surface that mounts the cutting insert cartridge to the material removal tool.

BRIEF DESCRIPTION OF THE DRAWING

The following detailed description of preferred embodiments can be read in connection with the accompanying drawings in which like numerals designate like elements and in which.

DETAILED DESCRIPTION

Figure 1:
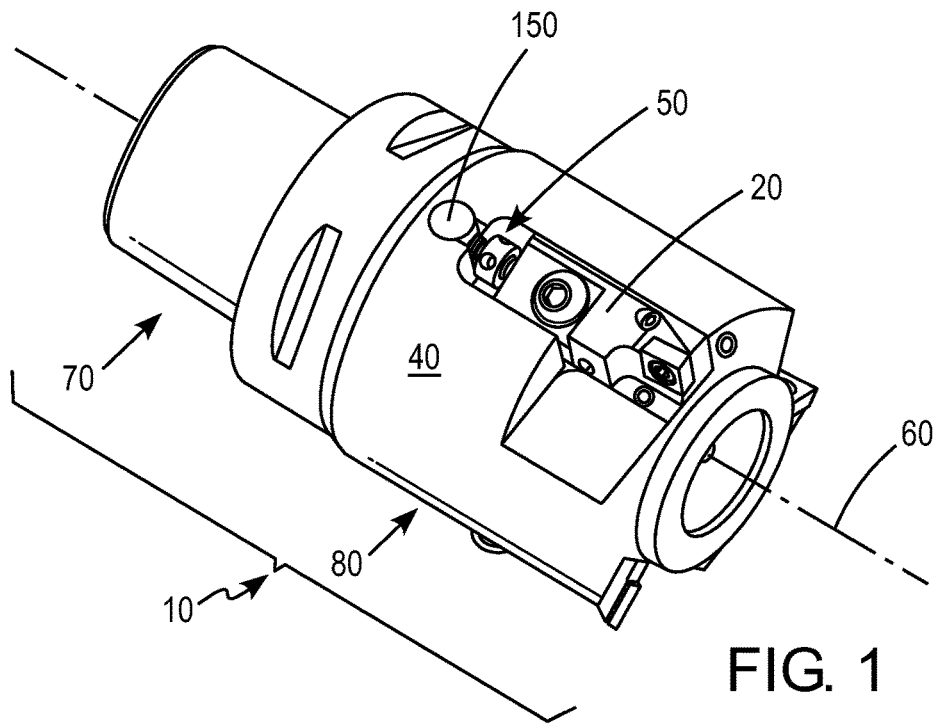
FIG. 1 is a perspective view of a first exemplary embodiment of a chip removing machining tool with a cutting insert cartridge and a first exemplary embodiment of an axial adjustment system including a differential screw.
Figure 2:
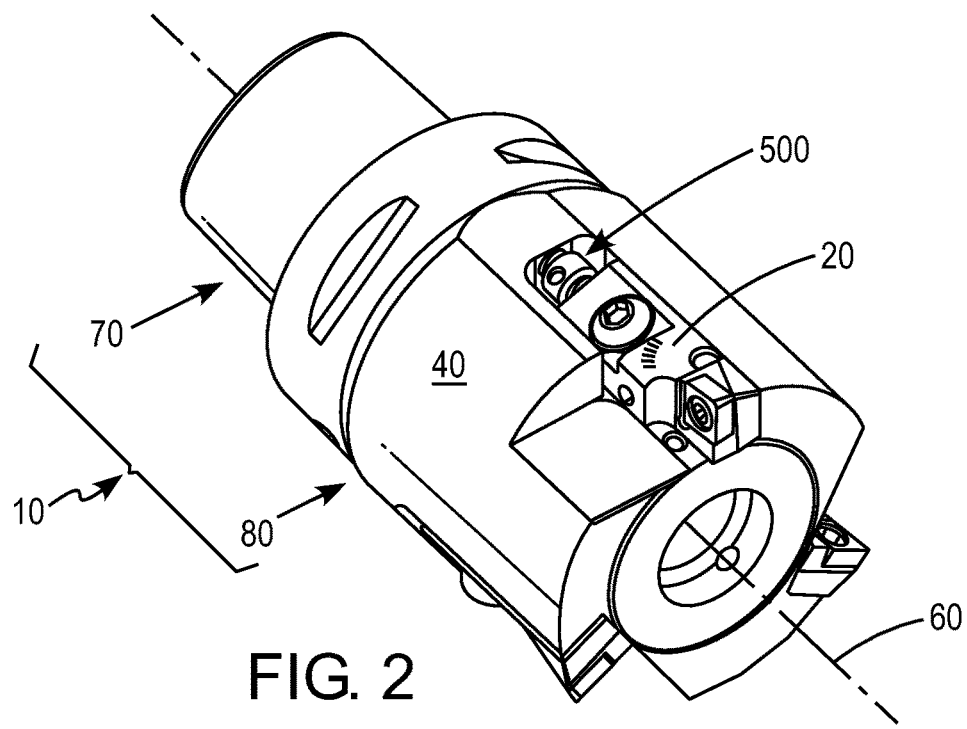
FIG. 2 is a perspective view of a second exemplary embodiment of a chip removing machining tool with a cutting insert cartridge and a second exemplary embodiment of axial adjustment system including a differential screw.

FIG. 1 is a perspective view of an exemplary embodiment of a chip removing machining tool with a cutting insert cartridge and a first exemplary embodiment of an axial adjustment system including a differential screw and FIG. 2 is a perspective view of another exemplary embodiment of a chip removing machining tool with a cutting insert cartridge and a second exemplary embodiment of an axial adjustment system including a differential screw. The exemplary chip removing machining tools 10 each comprise a cutting insert cartridge 20 mounted in a slot 30 (or other receiving area) in a surface of the tool body 40. An axial adjustment system (a first exemplary axial adjustment system 50 in FIG. 1; a second exemplary axial adjustment system 500 in FIG. 2) translates the cutting insert cartridge 20 in the slot axially with respect to the longitudinal axis 60 of the tool body 40. Other features of the tool body illustrated in FIGS. 1 and 2 include an attachment end portion 70 and a head portion 80.

Figure 3:
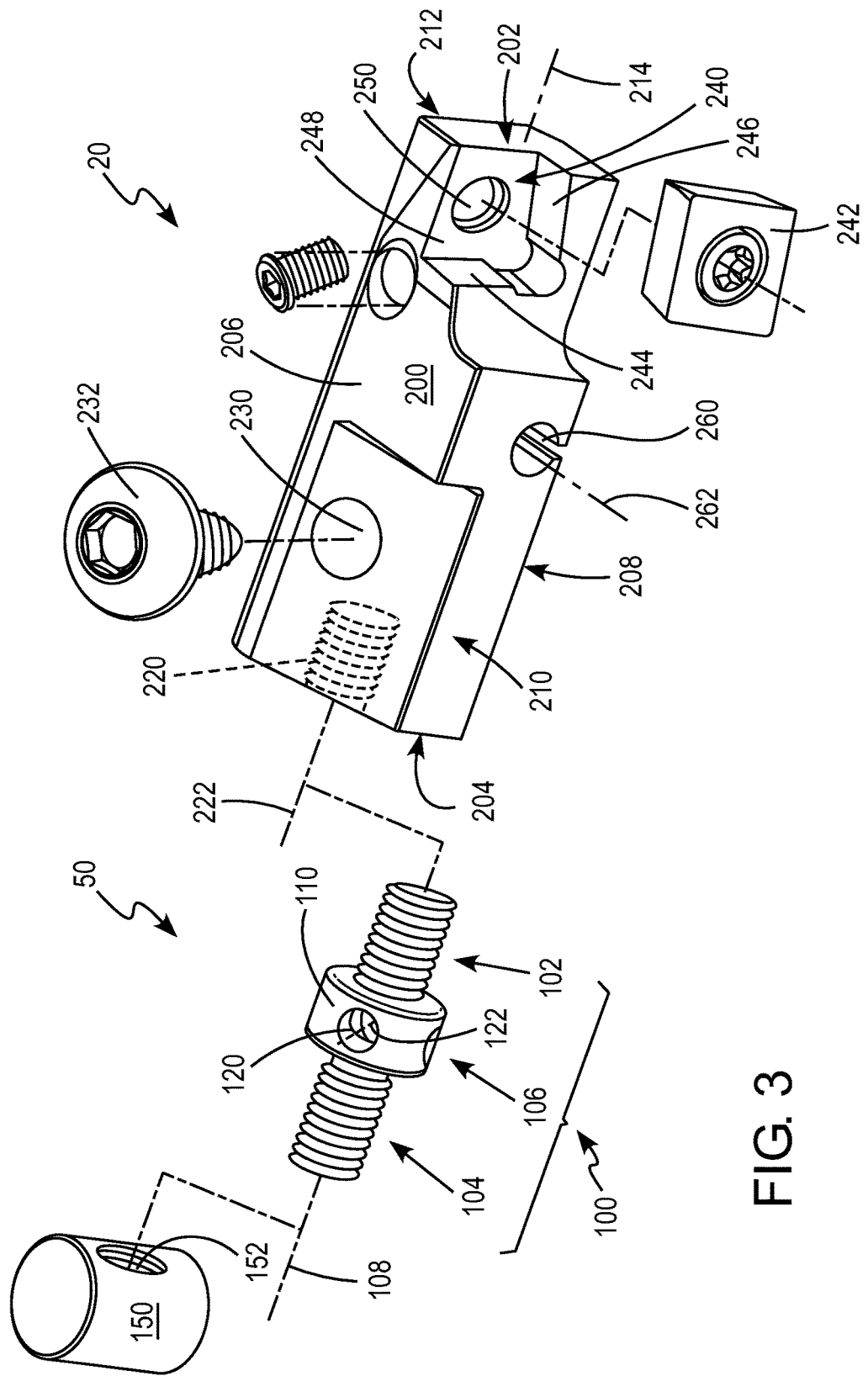
FIG. 3 is an exploded, perspective view of the cutting insert cartridge and axial adjustment system including a differential screw from FIG. 1.

FIG. 3 is an exploded, perspective view of an exemplary cutting insert cartridge 20 and first exemplary embodiment of an axial adjustment system 50 from FIG. 1. The axial adjustment system 50 includes a differential screw 100 having a first threaded portion 102, a second threaded portion 104 and an actuation portion 106. The first threaded portion 102, actuation portion 106 and second threaded portion 104 are positioned on an axis 108 of the differential screw 100 and the actuation portion 106 is, relative to axis 108, axially between the first threaded portion 102 and the second threaded portion 104. An engagement feature 120 (described further below) is located on an outer surface 110 of the actuation portion 106 and has an engagement axis 122 that is non-parallel to the axis 108 of the differential screw 100.

Figure 4:
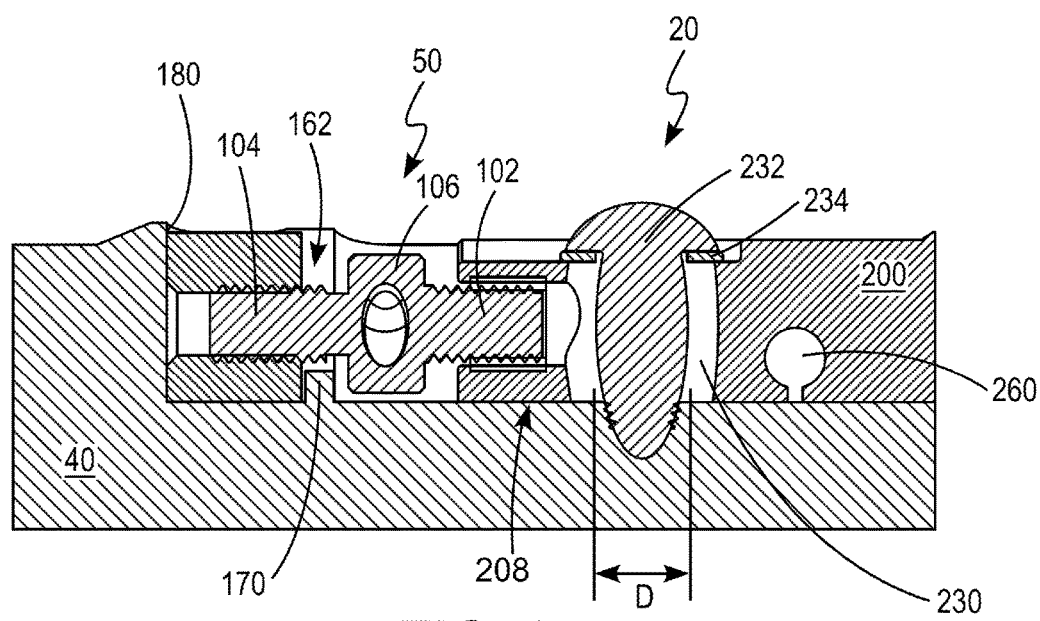
FIG. 4 is a cross-sectional view of a portion of the chip removing machining tool in FIG. 1 illustrating the arrangement of features of the cutting insert cartridge and axial adjustment system including a differential screw.

FIG. 4 is a cross-sectional view of a portion of the chip removing machining tool in FIG. 1 showing the cutting insert cartridge 20 and the axial adjustment system 50 including a differential screw 100 in an assembled state in the tool body 40. In the assembled state, the first threaded portion 102 of the differential screw 100 is threadedly engaged with the cartridge body 200. In particular, the first threaded portion 102 of the differential screw 100 is threadedly engaged in a first threaded opening 220 in a second end surface 204 of the cartridge body 200. Second threaded portion 104 of the differential screw 100 is threadedly engaged indirectly with the tool body 40. In particular, the second threaded portion 104 of the differential screw 100 is threadedly engaged in a threaded opening 152 of a cross dowel fastener 150.

The cross dowel fastener 150 is itself positioned in a complimentarily shaped opening 160 (see FIG. 5) in the tool body 40. An example of such a complimentarily shaped opening 160 can be seen in FIGS. 1, 4 and 5. The complimentarily shaped opening 160 is set off from, but also connected to the slot 30 (or other receiving area), for example connected by a channel 162. This arrangement allows for the insertion of the assembled cutting insert cartridge 20 and axial adjustment system 50 into the slot 30 and complimentary shaped opening 160 while the channel 162 accommodates a portion of the differential screw 100 connecting insert cartridge 20 to cross dowel fastener 150, for example, a portion of the second threaded portion 104 that is between the actuation portion 106 and the cross dowel fastener 150.

The complimentary shaped opening 160 prevents free rotation of the cross dowel fastener 150 when the differential screw 100 is rotated. For example, while the cross dowel fastener 150 may rotate about the axis 108 coincident to the turning of the differential screw 100 when the differential screw 100 is rotated, the cross dowel fastener 150 will also contact the walls of the opening 160 to prevent full rotation, or to limit rotation to a portion, e.g., less than 15-30 degrees, of full rotation. As a result, rotation of the second threaded portion 104 relative to an essentially non-rotating cross dowel fastener 150 causes the second threaded portion 104 to be translated axially by relative motion between the second threaded portion 104 and threaded opening 152 of cross dowel fastener 150. Additionally, a portion 170 of the tool body 40 protrudes between the cross dowel fastener 150 and the slot 30 (or other receiving area) and acts as a first bearing surface for cross dowel fastener 150 when the axial adjustment system 50 operates to urge the cartridge body 200 and the cross dowel fastener 150 toward each other. Note that portion 180 of the wall of the opening 160 acts as a second bearing surface for cross dowel fastener 150 when the axial adjustment system 50 operates to urge the cartridge body 200 and the cross dowel fastener 150 away from each other.

An example of a cross dowel fastener is a barrel nut, but other cross dowel fasteners with different shapes can be used, including polygonal bodies or cylindrical bodies of various shapes and/or faceting, or any other shape which allows cross dowel fastener to be retained in tool body 40 while also having a threaded opening to receive the second threaded portion 104 of the differential screw 100. A cylindrical shape, however, has benefits of ease of manufacture and a simple shape for mating to the tool body 40, and has a large surface for contact with tool body 40. A large surface for contact contributes to reduce contact stress in the connection of barrel nut 150 and complimentary shaped opening 160. Reduced stresses expand implementation of this embodiment with indirect threaded engagement to softer materials like aluminum, magnesium carbon fiber or non-metallic materials. Suitable materials for the cross dowel fastener can vary depending on application, but preferable are steel or brass.

Figure 5:
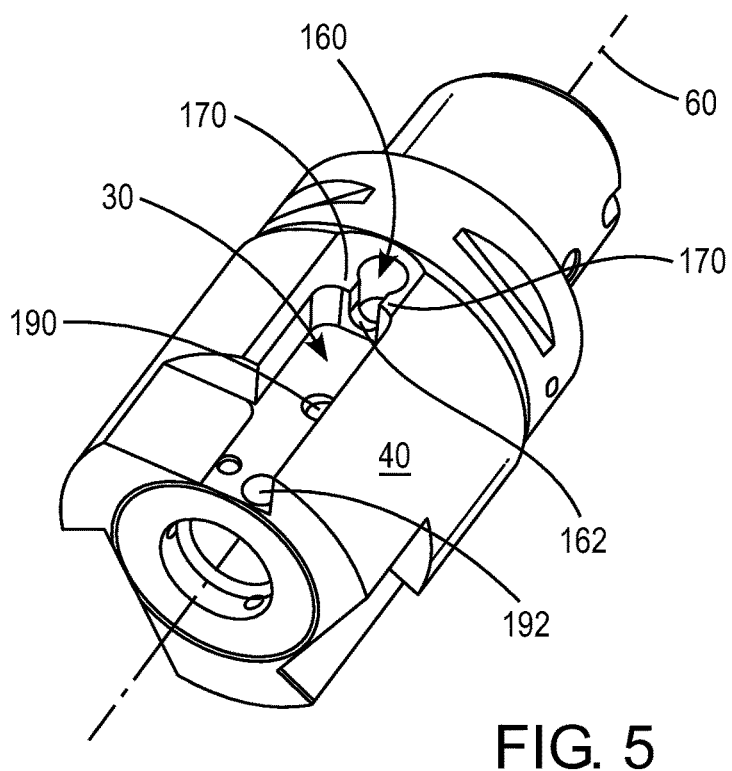
FIG. 5 is a perspective view of the chip removing machining tool in FIG. 1 with the cutting insert cartridge and axial adjustment system removed to show the seating area for the cartridge.

In addition to the slot 30 (or other receiving area), opening 160 and channel 162, other features for mounting the cutting insert cartridge 20 to the tool body 40 are shown in FIG. 5. These features include a threaded opening 190 to receive a portion of the threaded shank of a clamping screw 232 and a wear resistant pad 192.

Figure 6:
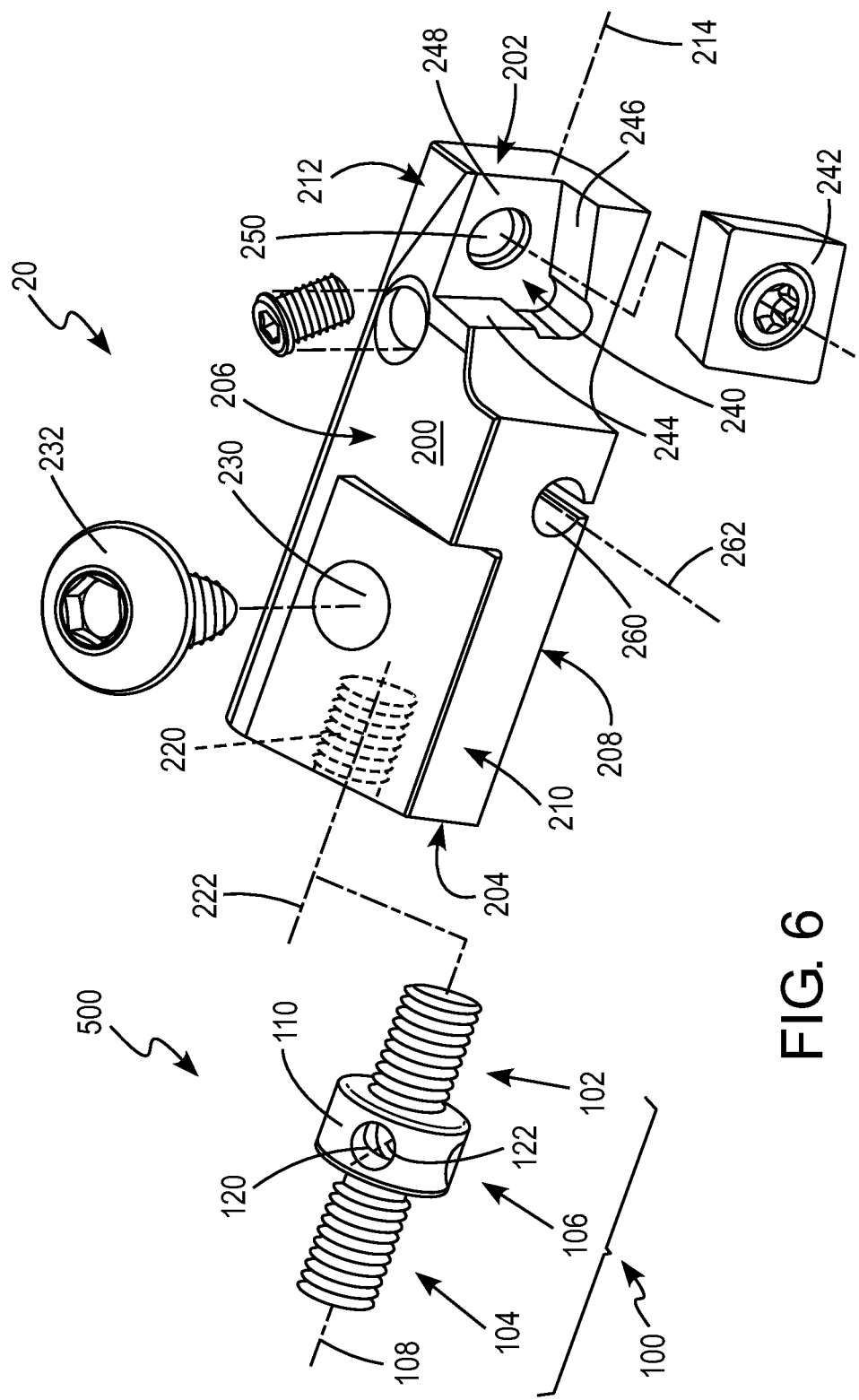
FIG. 6 is an exploded, perspective view of the cutting insert cartridge and axial adjustment system including a differential screw from FIG. 2.

FIG. 6 is an exploded, perspective view of another exemplary cutting insert cartridge 20 and the second exemplary embodiment of an axial adjustment system 500 from FIG. 2. The axial adjustment system 500 includes a differential screw 100 having a first threaded portion 102, a second threaded portion 104 and an actuation portion 106. The first threaded portion 102, actuation portion 106 and second threaded portion 104 are positioned on an axis 108 of the differential screw 100 and the actuation portion 106 is, relative to axis 108, axially between the first threaded portion 102 and the second threaded portion 104. An engagement feature 120 (described further below) is located on an outer surface 110 of the actuation portion 106 and has an engagement axis 122 that is non-parallel to the axis 108 of the differential screw 100.

Figure 7:
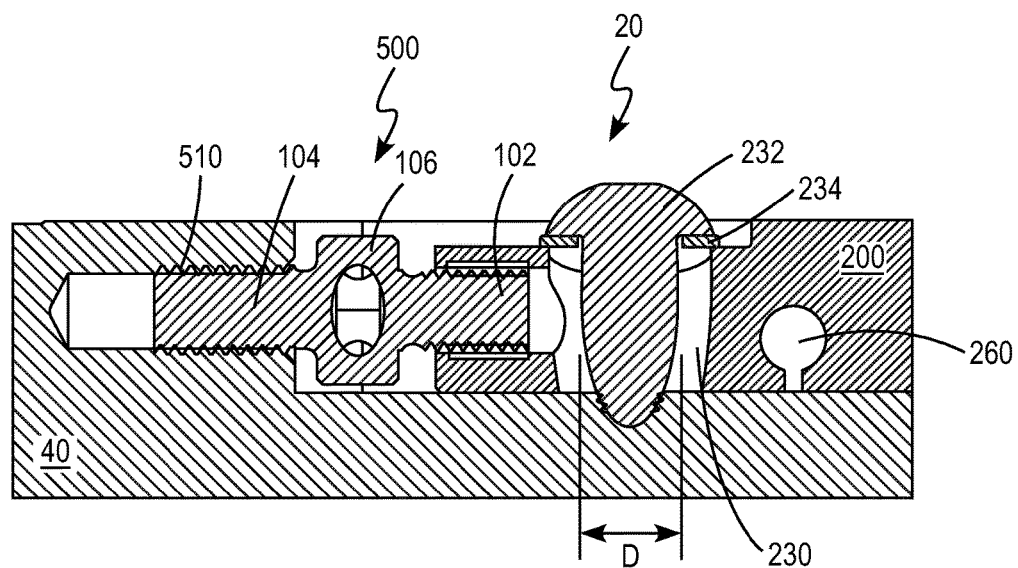
FIG. 7 is a cross-sectional view of a portion of the chip removing machining tool in FIG. 2 illustrating the arrangement of features of the cutting insert cartridge and axial adjustment system including a differential screw.

FIG. 7 is a cross-sectional view of a portion of the chip removing machining tool in FIG. 6 showing the cutting insert cartridge 20 and the axial adjustment system 500 including a differential screw 100 in an assembled state in the tool body 40. In the assembled state, the first threaded portion 102 of the differential screw 100 is threadedly engaged with the cartridge body 200. In particular, the first threaded portion 102 of the differential screw 100 is threadedly engaged in a first threaded opening 220 in a second end surface 204 of the cartridge body 200. Second threaded portion 104 of the differential screw 100 is threadedly engaged directly with the tool body 40. In particular, the second threaded portion 104 of the differential screw 100 is threadedly engaged in a threaded opening 510 in the tool body 40 which is located at one end of the slot 30 (or other receiving area).

The assembled cutting insert cartridge 20 and axial adjustment system 500 can be inserted into the slot 30 and then the second threaded portion 104 of the differential screw 100 can be threadedly engaged into the threaded opening 510 by turning of the differential screw 100. Comparing the second exemplary embodiment of the axial adjustment system 500 to the first exemplary embodiment of the axial adjustment system 50, the difference is that axial adjustment system 500 does not use a cross dowel fastener 150 and is directly mounted to the tool body 40 via threaded connection between second threaded portion 104 of the differential screw 100 and threaded opening 510 in the tool body 40.

Turning of the differential screw 100 also changes the amount of threaded engagement between the first threaded portion 102 of the differential screw 100 and the first threaded opening 220 in a second end surface 204 of the cartridge body 200 and will move the axial position of the cutting insert cartridge 20 in the slot. Accordingly, suitable pre-threading of the first threaded portion 102 of the differential screw 100 in the first threaded opening 220 may be used so that, after threading the second threaded portion 104 of the differential screw 100 into the threaded opening 510, the assembled cutting insert cartridge 20 is mountable in the slot 30 via clamping screw 232. Once the second threaded portion 104 of the differential screw 100 is threadedly engaged directly with the tool body 40, further rotation of the second threaded portion 104 occurs relative to the stationary threaded opening 510 and causes the second threaded portion 104 to be translated axially by relative motion between the second threaded portion 102 and threaded opening 510.

Figure 8:
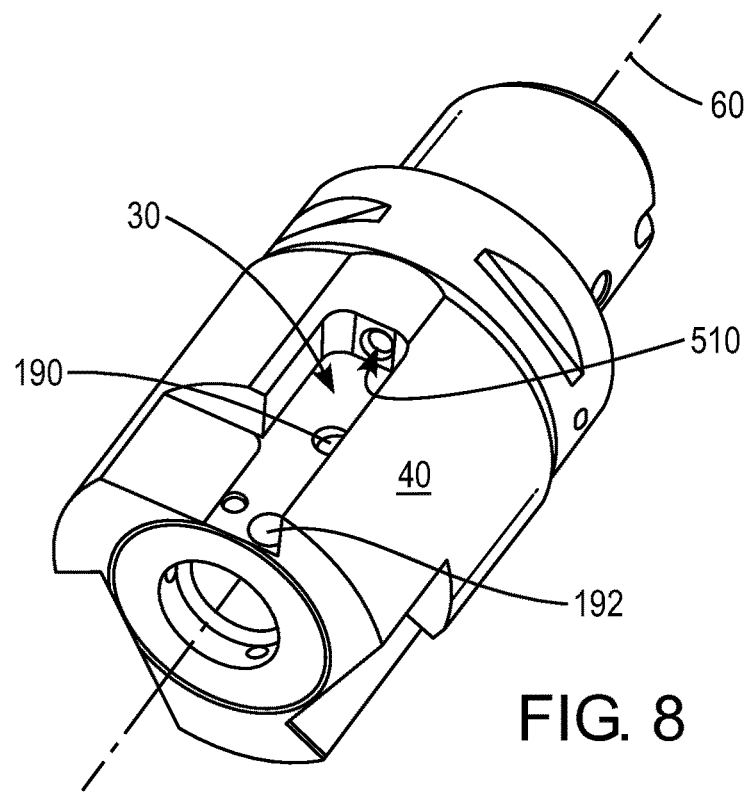
FIG. 8 is a perspective view of the chip removing machining tool in FIG. 2 with the cutting insert cartridge and axial adjustment system removed to show the seating area for the cartridge.

In addition to the slot 30 (or other receiving area) and threaded opening 510, other features for mounting the cutting insert cartridge 20 to the tool body 40 are shown in FIG. 8. These features include a threaded opening 190 to receive a portion of the threaded shank of a clamping screw 232 and a wear pad 192.

Although the cutting insert cartridge 20 in the illustrated examples is the same, the cutting insert cartridge can take any form that seats a cutting tool insert, is removably mountable to the tool body, and can operably cooperate with the axial adjustment systems disclosed herein. A seen from, for example, FIGS. 3 and 6, the cutting insert cartridge 20 can include a cartridge body 200, which can have any suitable shape. In the illustrated examples, the cartridge body 200 is generally rectangular in shape having generally six nominal sides: a first end surface 202 generally opposing a second end surface 204; a top surface 206 generally opposing a bottom surface 208; and a first side surface 210 generally opposing a second side surface 212. The top surface 206; bottom surface 208; first side surface 210; and second side surface 212 generally interconnect the first end surface 202 and second end surface 204 to form a solid body having a longitudinal axis 214 oriented from the first end surface 202 to the second end surface 204. The foregoing use of terms and assigning of six surfaces to the cartridge body 200 does not preclude having irregular surfaces, cutout regions or other features on any of the named surfaces while still being generally described as having a general rectangular shape.

The cutting insert cartridge 20 includes a first threaded opening 220 in the second end surface 204. As described herein, the first threaded portion 102 of the differential screw 100 is threadedly engaged in a first threaded opening 220. In exemplary embodiments, the first threaded opening 220 has a thread axis 222 that is collinear with the longitudinal axis 214 of the cartridge body 200. Accordingly, in such embodiments, the axis 108 of the differential screw 100 is also collinear with the longitudinal axis 214 of the cartridge body 200. In other embodiments, the thread axis 222 can be skewed relative to the longitudinal axis 214 of the cartridge body 200 or at any other orientation to correspond to the arrangement of the slot, the opening 160 or threaded opening 510, and the desired function of the axial adjustment system 50,500.

An opening 230 in the cartridge body 200 extends from the top surface 206 to the bottom surface 208 and receives the shank of a clamping screw 232. Clamping screw 232 typically is not threadingly engaged with the tool body 40, but rather the opening 230 is oversized relative to a diameter D of the portion of the shank of the clamping screw 232 located in the opening 230. That is, the radial dimension of the opening 230 is larger than the size of the diameter D so that there is a space between the opening 230 and the outer surface of the correspondingly located portion of the shank, as seen in FIGS. 4 and 7. A distal end of the shank of the clamping screw 232 is threaded into a threaded opening 190 in slot 30 and, by tightening or loosening, a desired mounting force is generated to hold the cutting insert cartridge 20 in a position relative to the slot 30. An optional washer 234 is shown with the clamping screw 232. As shown in FIGS. 3 and 6, the top surface 206 in the vicinity of the opening 230 is angled relative to a rectilinear portion the top surface 206 in other regions of the cartridge body 200. However, an angled top surface 206 is not necessary.

The cartridge body 200 includes a seat 240 for a cutting tool insert 242. In the exemplary embodiment shown in FIGS. 3 and 6, the seat 240 has two surfaces 244,246 to support flanks of the cutting tool insert 242 and surface 248 to support the bottom surface of the cutting tool insert 242. In the surface 248 is an opening 250 to support a mounting mechanism for the cutting tool insert 242, for example, a threaded fastener.

The cartridge body 200 can optionally include a recess 260. In the exemplary embodiment shown in FIGS. 4 and 7, the recess 260 extends through at least a portion of the cartridge body 200 from the first side surface 210 toward a second side surface 212. A longitudinal axis 262 of the recess 260 from the first side surface 210 toward the second side surface 212 is non-parallel and can be, though is not necessarily, orthogonal to the longitudinal axis 214 of the cartridge body 200. At least a portion of the recess 260 is open to the bottom surface 208 of the cartridge body 200.

Figure 9A:
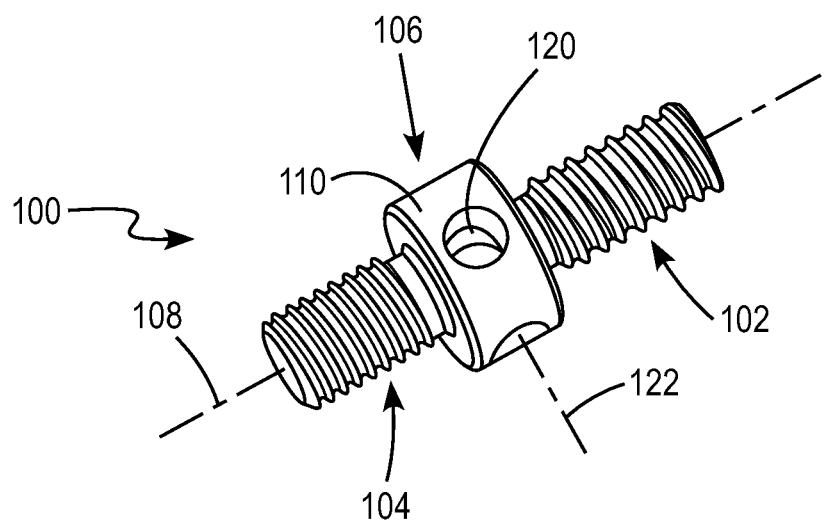
FIGS. 9A and 9B show exemplary embodiments of a cutting insert adjustment differential screw with two threaded regions, the first exemplary embodiment (FIG. 9A) having threads that have the same handedness, but a different pitch (FIG. 9B) having threads that have different handedness and the second exemplary embodiment.
Figure 9B:
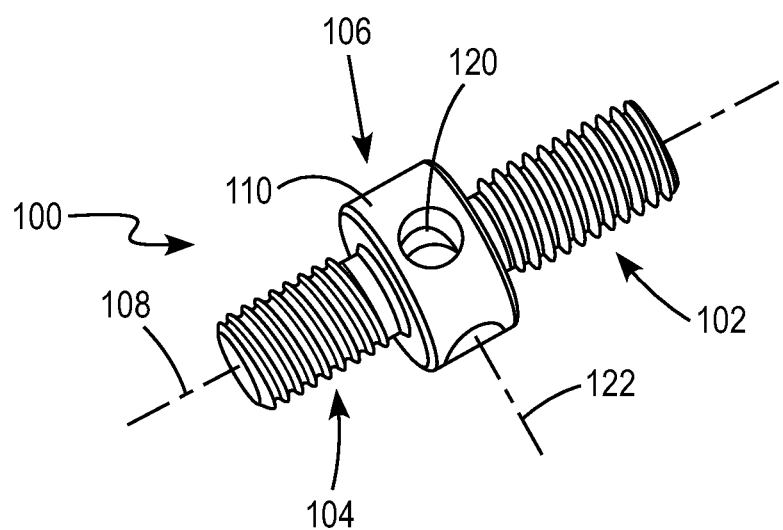

FIGS. 9A and 9B illustrate two embodiments of differential screw 100. In FIG. 9A, the threads on the first threaded portion 102 and second threaded portion 104 have the same handedness, i.e., are either both left-handed or both right handed, and the pitch of the threads in the two portions is different. In FIG. 9B, the threads on the first threaded portion 102 and second threaded portion 104 have different handedness, i.e., one is left-handed, the other right handed, and the pitch of the threads in the two portions is either the same or is different. The combination of handedness and pitch is selected to achieve a desired translation rate, length per 360 degree rotation about the turning axis.

Differential screw 100 allows bi-directional axial translation of cartridge body 200 (and, by extension, bi-directional axial translation of features connected to the cartridge body 200, such as seat 240 and any cutting tool insert 242 mounted in seat 240, as well as the cutting insert cartridge 20 as a whole). For example, as the differential screw is turned about axis 108, i.e., the turning axis for the differential screw 100, structures engaged with the first threaded portion 102 and second threaded portion 104 will translate axially on their respective portions depending on handedness and pitch of the threads in the respective first threaded portion 102 and second threaded portion 104. In exemplary embodiments, however, translation of the structure to which the second threaded portion 104 is directly or indirectly connected, i.e., the tool body 40, is inhibited or prevented. Therefore, once a sufficient translation force is produced to overcome the clamping forces exerted on cartridge body 200 by clamping screw 232, the cartridge body 200 will axially translate. Preferably, translation of cartridge body 200 occurs without releasing any torque on clamping screw 232, which allows reduction in adjustment time and improved accuracy of adjustment. However, in alternative embodiments, the clamping screw 232 can be loosened without disengaging from threaded opening 190 in the slot 30 to facilitate axial translation of the cartridge body 200. It should be noted that the difference in size between the opening 230 in the cartridge body 200 and diameter D of the shank of the clamping screw 232 defines the axial distance that mounted cartridge body 200 can be axially translated by operation of the axial adjustment system 50, 500 without withdrawing the clamping screw 232 for threaded opening 190.

Figure 10A:
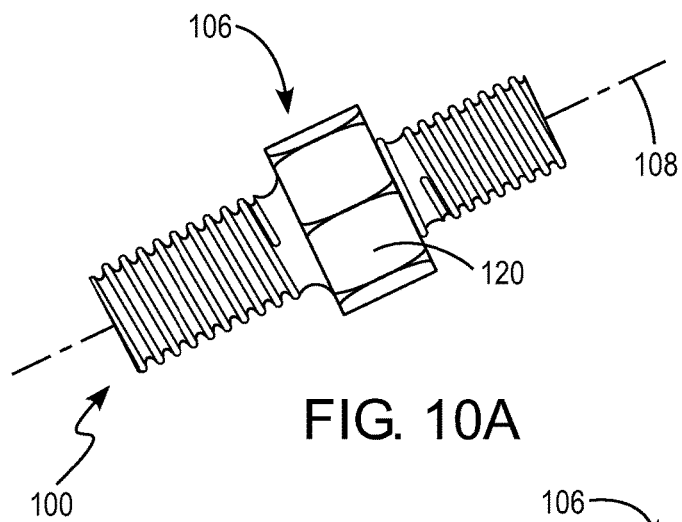
FIGS. 10A to 10C show example variations in the form of the actuation portion and the engagement feature on an outer surface of the actuation portion of exemplary cutting insert adjustment differential screws.

FIGS. 9A, 9B and 10A to 100 illustrate different embodiments of actuation portions 106 for a differential screw 100. In the embodiment of FIGS. 9A and 9B, the actuation portion 106 is cylindrical. In other exemplary embodiments, the actuation portion 106 (when viewed along axis 108) is polygonal in shape or shaped like a gear. Examples of polygonal shapes for the actuation portion 106 include hexagonal, such as shown in FIG. 10A, or square or triangular.

Figure 10B:
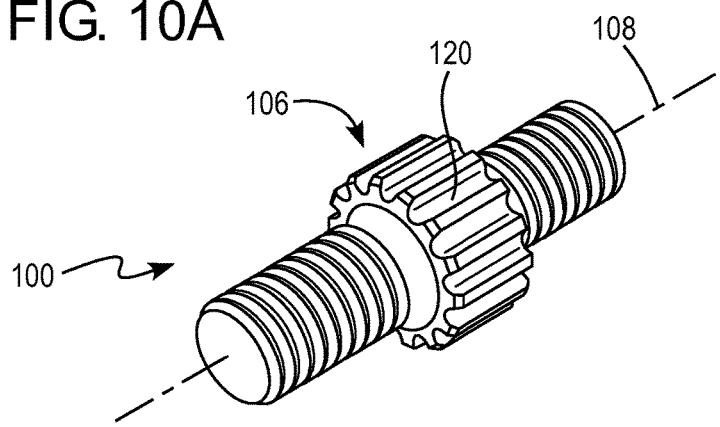
Figure 10C:
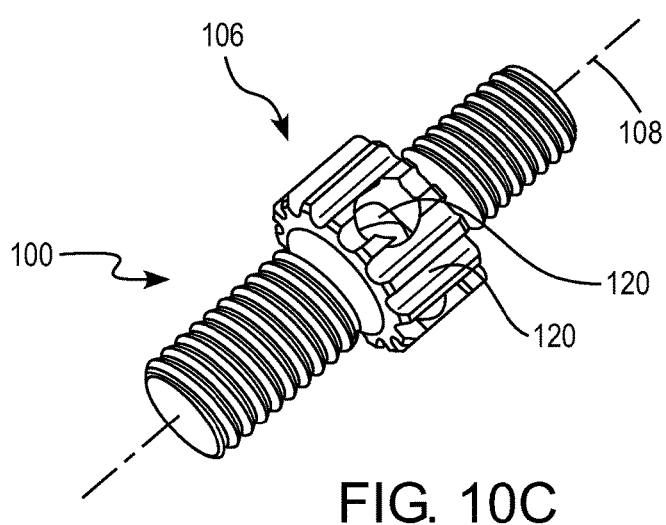

In exemplary embodiments, the actuation portion 106 includes an engagement feature 120 by which the actuation portion 106 is engaged, e.g., with a tool or by hand, and by which the differential screw 100 is rotated about axis 108. In connection with embodiments where the actuation portion 106 is polygonal in shape, the outer circumferential surface produces faceting that can be engaged by a suitable tool or by hand. In connection with some embodiments where the actuation portion 106 is cylindrical, the outer surface can include engagement features in the form of periodic apertures that extend into the interior of the actuation portion 106 at an axis. The axis of the aperture can be oriented orthogonal to the axis 108 of the differential screw 100. The aperture itself can have a suitable shape to engage a tool, for example a shape to engage the head of a screw driver, Allen wrench or other tool. Example shapes include, but are not limited to, a slot, a circle, or a hex-based shape. Also, in place of an aperture, a shaped protrusion extending outward from the outer surface of the actuation portion 106 can be used. In connection with other embodiments where the actuation portion 106 is cylindrical, the outer surface can include engagement features in the form of a plurality of ridges and grooves, the peaks and valleys of which can be oriented parallel to axis 108 of the differential screw 100. An example of engagement features in the form of a plurality of ridges and grooves is shown in FIG. 10B. Combinations of these features can also be utilized, such as shown in FIG. 10C, which has both engagement features in the form of a plurality of ridges and grooves and engagement features in the form of periodic apertures that extend into the interior of the actuation portion 106. The apertures have an inward extending axis that is oriented orthogonal to the axis 108 of the differential screw 100.

In exemplary embodiments, the outer surface of the actuation portion 106 is at a radial distance from the axis 108 that is greater than the radial distance of the outermost surface of the first threaded portion 102 and the second threaded portion 104. An outer surface of the actuation portion 106 at a greater radial distance from the axis 108 will create a mechanical advantage proportional to that distance for turning of the differential screw 100 relative to the axis 108. In alternative embodiments, the radial distance from the axis 108 of the outer surface of the actuation portion 106 can be equal to or less then the radial distance of the outermost surface of the first threaded portion 102 and the second threaded portion 104. In some embodiments, the actuation portion 106 is co-axially positioned relative to the axis 108 of the different screw 100, while in other embodiments it is offset.

Figure 11:
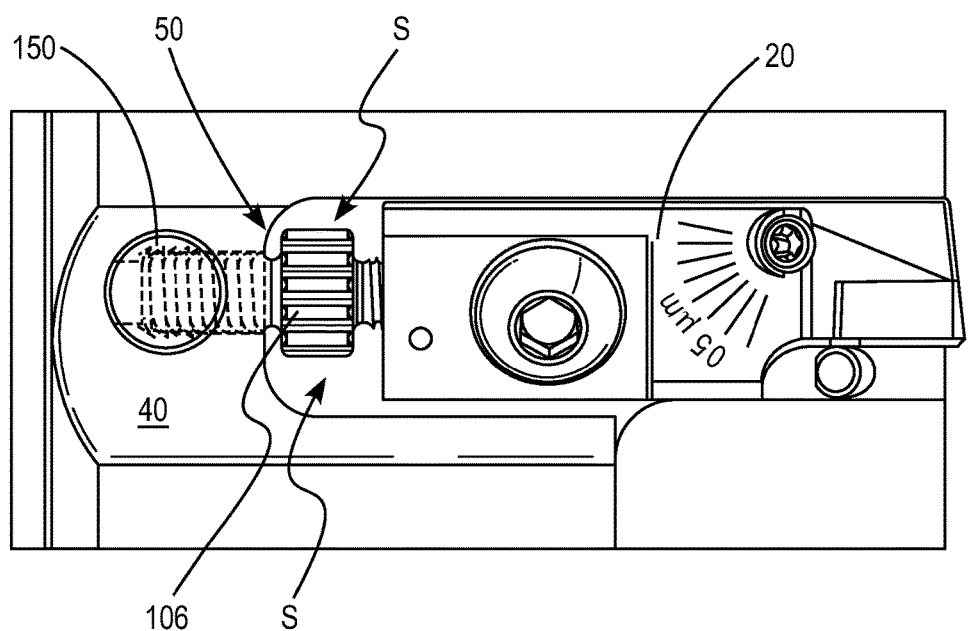
FIG. 11 is a top view of a cutting insert cartridge mounted in a chip removing machining tool with and an exemplary embodiment of an axial adjustment system including a differential screw and shows, in partial cut away view, the engagement of the differential screw with the cross dowel fastener.

When the cutting insert cartridge 20 is mounted to a tool body 40, inclusion of either embodiment of the axial adjustment system 50,500 locates the actuation portion 106 in a spaced apart relationship S to surfaces of the slot 30. FIG. 11 is a top view of an exemplary embodiment of a cutting insert cartridge 20 mounted to tool body 40 showing this spaced apart relationship S. The spaced apart relationship S provides improved access to the actuation portion 106 or, if present, to the engagement feature 120. Although the embodiment in FIG. 11 depicts axial adjustment system 50, the above comments on improved access apply equal to embodiments using axial adjustment system 500.

Although illustrated and discussed in the context of a rotating cutting tool, the structures, techniques and methods disclosed herein can be applied equally to turning tools. Also, the structures, features and operation of axial adjustment systems including the differential screw and optional cross dowel fastener can be applied for one-dimensional translation, i.e., translation in the same axis as the axis of the differential screw, of structures other than cutting insert cartridges. For example, workpiece stages, components of machine tools and fixtures can be one-dimensionally translated by suitable addition of the axial adjustment systems disclosed herein.

Also, although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A cutting insert cartridge for a chip removing machining tool, comprising:
   a cartridge body including a first end surface, a second end surface, a top surface, and a bottom surface and having a longitudinal axis oriented from the first end surface to the second end surface;
   a seat for a cutting tool insert, a surface of the seat intersecting the top surface of the cartridge body proximate the first end surface of the cartridge body;
   a threaded opening in the second end surface of the cartridge body;
   an opening in the cartridge body extending from the top surface to the bottom surface of the cartridge body, the opening being located between the seat and the second end surface of the cartridge body;
   an axial adjustment system including a differential screw having a first threaded portion, a second threaded portion, an actuation portion, and an engagement feature on an outer surface of the actuation portion, wherein the first threaded portion, actuation portion and second threaded portion are positioned on an axis of the differential screw and the actuation portion extends axially between the first threaded portion and the second threaded portion, wherein the engagement feature has an engagement axis that is non-parallel to the axis of the differential screw, and wherein the first threaded portion of the differential screw is threadedly engaged in the threaded opening in the second end surface of the cartridge body; and
   a cross dowel fastener threaded on the second threaded portion of the differential screw.

2. The cutting insert cartridge of claim 1, wherein the engagement feature is an aperture in the outer surface of the actuation portion and wherein the engagement axis of the aperture, which extends into a body of the engagement feature is orthogonal to the axis of the differential screw.

3. The cutting insert cartridge of claim 1, wherein the outer surface of the actuation portion is at a radial distance from the axis of the differential screw that is greater than a radial distance of an outer surface of at least one of the first threaded portion and the second threaded portion.

4. The cutting insert cartridge of claim 1, wherein the axis of the differential screw is collinear with the longitudinal axis of the cartridge body.

* * * * *